United States Patent
Bucco Morello

(10) Patent No.: US 6,695,390 B2
(45) Date of Patent: Feb. 24, 2004

(54) APPARATUS FOR ACTUATING A SIDE DOOR IN A CARGO VEHICLE

(76) Inventor: Anacleto Matteo Bucco Morello, Carrera 19B, entre 60 y 61 Res. Puerta Dorada TorreC Apt No. 12. Piso 6 Barquisimeto, Edo Lara (VE)

(*) Notice: Subject to any disclaimer, the term of this patent is extended or adjusted under 35 U.S.C. 154(b) by 0 days.

(21) Appl. No.: 10/219,869

(22) Filed: Aug. 15, 2002

(65) Prior Publication Data

US 2003/0127876 A1 Jul. 10, 2003

(30) Foreign Application Priority Data

Aug. 17, 2001 (VE) .................................................. 26533

(51) Int. Cl.[7] .............................................. B62D 33/027
(52) U.S. Cl. ........................ 296/181; 296/36; 160/210; 160/213; 49/345
(58) Field of Search .............................. 296/181, 36, 50, 296/56, 148, 183; 160/210, 213; 49/339, 340, 345

(56) References Cited

U.S. PATENT DOCUMENTS

| | | | | | |
|---|---|---|---|---|---|
| 4,140,339 A | * | 2/1979 | Fredin | .................... | 296/100.17 |
| 4,268,084 A | * | 5/1981 | Peters | ......................... | 296/148 |
| 4,346,931 A | * | 8/1982 | Merkle | ....................... | 296/148 |
| 4,568,237 A | * | 2/1986 | Krause et al. | .............. | 414/519 |
| 5,022,696 A | * | 6/1991 | Moller | ......................... | 296/36 |
| 5,143,496 A | * | 9/1992 | Smith et al. | ................... | 410/68 |
| 5,271,652 A | * | 12/1993 | Watanabe et al. | .............. | 296/36 |
| 6,554,346 B2 | * | 4/2003 | Sugimoto | .................... | 296/147 |

* cited by examiner

Primary Examiner—D. Glenn Dayoan
Assistant Examiner—Patricia L. Engle
(74) Attorney, Agent, or Firm—Gifford, Krass, Groh, Sprinkle, Anderson & Citkowski, P.C.

(57) ABSTRACT

A jointed lateral hopper door device capable of raising and retracting one or more lateral hopper doors upward, allowing a totally free access space without impeding access to the cargo material.

4 Claims, 1 Drawing Sheet

APPARATUS FOR ACTUATING A SIDE DOOR IN A CARGO VEHICLE

BRIEF BACKGROUND OF THE UTILITY MODEL

In the field in which the present utility model is developed, the means used to close the side compartments of cargo vehicles such as trucks, closed trucks, boxcars, trailers, or semi-trailers are observable. The means utilized for said purpose generally use detachable gratings, "santamaria"-type hopper doors, or simply crossbars, depending, of course, on the type of merchandise transported.

Nevertheless, although such systems serve the functions for which they were created more or less efficiently, they present weaknesses in terms of how they are opened or closed, given that some or all of the components, such as hinged side bars, usually need to be dismantled or present relatively complicated mechanisms such as "santamaria"-type sliding hopper doors.

The present utility model has the purpose of providing a foldable hopper door mechanism that can be folded upward and driven by a hydraulic or pneumatic means, which allows the following advantages:

It provides maximum access space, given that it in no way interferes with cargo vehicle entry into the internal space.

It facilitates the operation of the hopper door by remote activation, without the direct intervention of the operator.

It defines a safety measure during the running and parking of the vehicle and its cargo, given that the hydraulic or pneumatic mechanism makes it possible to keep the hopper door tightly closed, unless it is directly driven, for example, from the cab of the vehicle.

It is especially useful in sheds or more or less enclosed spaces, given that during operation it takes up little lateral space in the travel of the hopper door, and it also does not especially take up space above when it reaches its maximum [degree of] opening.

BRIEF DESCRIPTION OF THE DIAGRAMS

The mechanism, which is relatively simple but novel, is represented in the attached diagrams in its essentially operative or functional part. In said diagrams:

In this sense, said mechanism is used in closed truck-type vehicles, boxcars, trailers, or semi-trailers, with lateral opening or access of the hopper door.

Figure 1:
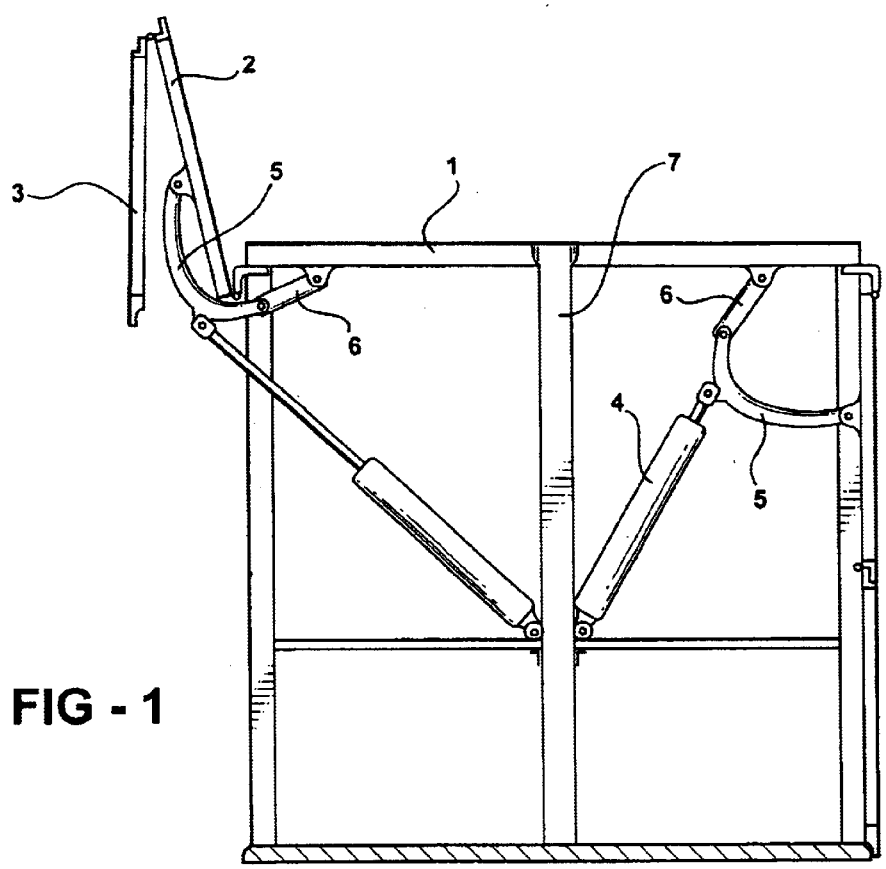
FIG. 1 is a view of the cross section of a cargo vehicle that uses the mechanism proposed here, showing the components involved, with the hopper door in the open position (left side of the figure) and in the closed position (right side of the figure).
Figure 2:
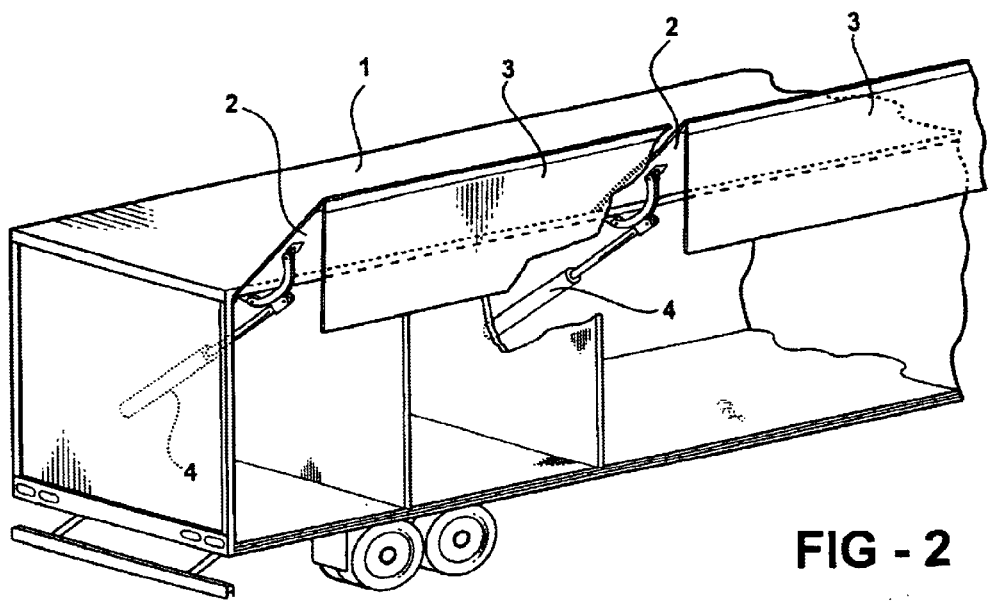
FIG. 2 is a schematic partial general view of said type of vehicle, seen in projection, with one of its lateral hopper doors open.

In FIG. 1, as has been pointed out, the cross section of a cargo-transport vehicle 1 is shown, which has accesses on both, opposite sides (right and left). Usually, and according to the principles of the proposed utility model, two mechanisms per side are used, but for reasons of clarity, only one is shown for each side.

As can be observed from the diagrams, hydraulic arm 4 is fixed at its lowest point to a perpendicular pivoting joint, which allows it to move in that direction. The telescoping axle of the hydraulic arm is connected at its far end, by means of a pivot, to curved arm 5, which in turn is connected at its innermost part to a coupled straight extension 6 capable of turning at the upper structure of the truck. The opposite end of curved arm 5 is coupled internally to top part 2 of the folding hopper door, which in turn is hinged to bottom part 3.

Assuming, now, that the hopper door is found in the closed position (fight side of FIG. 1), hopper door 2,3 is found totally unfolded and shutting the corresponding lateral space in its entirety. Therefore, arm 4 will be contracted, as will the different elements connected to it. When hydraulic arm 4 is activated, its movement makes curved arm 5 tend to go out of the truck, but this is limited by straight extension portion 6, which is now in an inclined position but close to horizontal. Curved arm 5, therefore, will not move again other than to push portion 2 of the hopper door, causing it to rise and leaving portion 3 of same hanging vertically.

As will be made evident, the later or eventual retraction of hydraulic arm 4 will make the movement of all the component parts operate in reverse and return to their original initial resting position. (The intermediate steps are not shown in the figures.)

From what has been exposed above, it is seen that the hopper door complies with the basic principles of economy of space and ease of operation indicated above.

What is claimed is:

1. An apparatus for actuating a side hopper door in a cargo transport vehicle, comprising:
    said door having a substantially planar shape and including a top part and a hingedly connected bottom part; and
    a hydraulically actuable arm secured to an interior location of the cargo vehicle, an extending and telescoping end of said arm pivotally securing to an arcuately curved linkage, said linkage securing at a first end to a location to said top part and at a second end to a top underside location of the cargo vehicle interior;
    said door moving in both lateral and vertical directions, exterior of the vehicle, between opened and closed positions.

2. The apparatus as described in claim 1, said linkage further comprising an arcuately curved arm hingedly connected to an inside surface of said top part, a straight extension portion hingedly connected at a first end to an extending end of said curved arm and at a second end to said top underside location of the cargo vehicle interior.

3. The apparatus as described in claim 1, further comprising a pair of actuating side door apparatuses located on each of first and second sides of the cargo transport vehicle.

4. The apparatus as described in claim 1, said hydraulic arm pivotally securing to an intermediate interior location of the cargo vehicle interior, and between a top and bottom thereof.

* * * * *